N. J. BARRON.
ANIMAL TRAP.
APPLICATION FILED MAY 21, 1908.
909,981.
Patented Jan. 19, 1909.
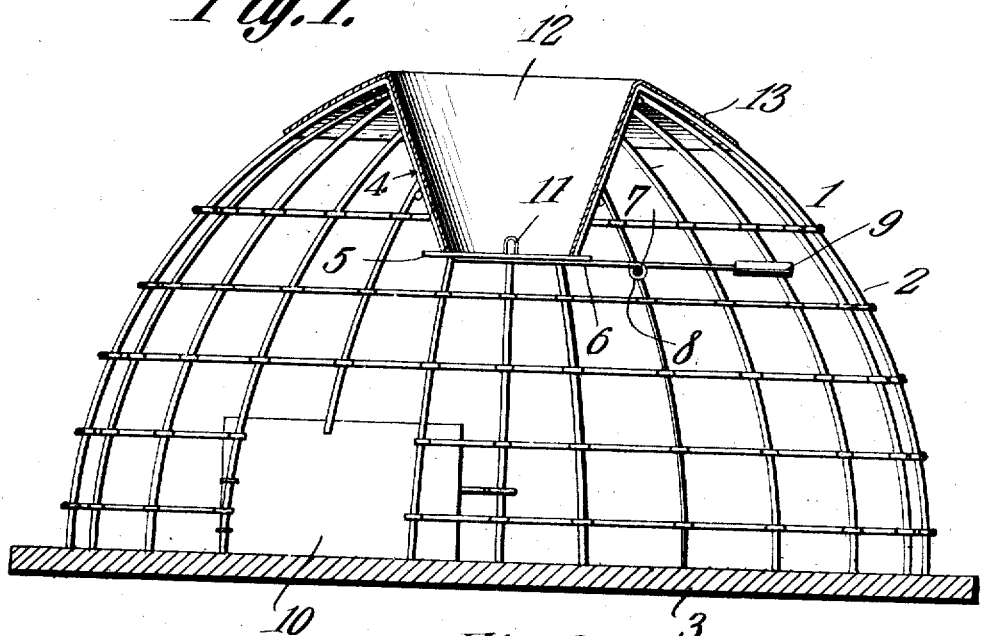
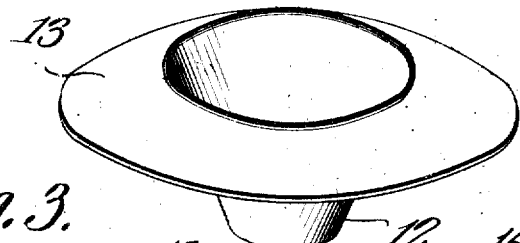
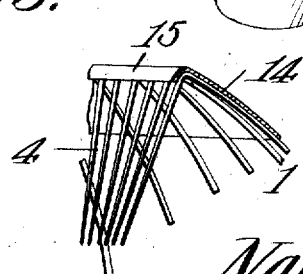
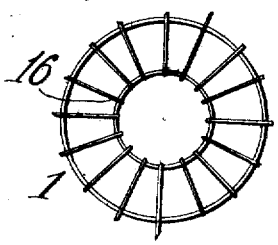
Witnesses
Inventor
Nathan J. Barron.
By C. A. Snow & Co.
Attorneys

UNITED STATES PATENT OFFICE.

NATHAN J. BARRON, OF LINDEN, TEXAS.

ANIMAL-TRAP.

No. 909,981.  Specification of Letters Patent.  Patented Jan. 19, 1909.

Application filed May 21, 1908. Serial No. 434,187.

*To all whom it may concern:*

Be it known that I, NATHAN J. BARRON, a citizen of the United States, residing at Linden, in the county of Cass and State of Texas, have invented a new and useful Animal-Trap, of which the following is a specification.

This invention relates to animal traps and has especial reference to traps for catching rats, mice and birds.

The object of the invention is to provide an improved animal trap by means of which a number of animals or birds may be caught without resetting the trap, the trap being automatically reset, as soon as the animal or bird is caught.

The invention consists of an improved animal trap, constructed, and arranged as hereinafter set forth and claimed.

Referring to the drawing, Figure 1 is a side view, in vertical section of an animal trap constructed in accordance with this invention. Fig. 2 is a detail view in perspective of a portion of the trap. Fig. 3 is a detail view of a portion of the top of the trap and a shield at the entrance opening showing a modification of the shield. Fig. 4 is a plan view of a portion of the top of the trap showing the wire funnel omitted.

The trap 1 may be in the form of a dome as shown or other suitable shape, made of woven wire 2, with a mesh small enough to insure the retention of small animals such as mice, and provided with a bottom 3 of wood, or other suitable material. The trap may be of any size desired, and is formed at its top with a passageway 4, preferably of a funnel shape, and depending from the top, and of a width sufficient to permit the passage into the trap of rats, and mice, and small birds, such as English sparrows.

Extending across the bottom of the funnel shaped passageway 4 is a tilting door or flap 5, consisting of a plate of tin, or other suitable material, hinged at its rear end in any suitable manner to the trap and as here shown, by means of an arm 6, consisting of a wire secured at its forward end to the under side of the flap 5, and extending rearwardly and bent about a wire 7, to form a hinge 8 therewith, the wire 7 being secured at its ends to the sides of the trap. The rear end of the arm 6 is provided with a weight 9 by means of which the door 5 is held up against the lower end of passageway 4. The trap 1 is provided with a suitable door 10 in its side to permit of the removal of the animals or other things caught in the trap. The flap 5 may be provided with a loop 11 or other suitable device to secure bait on the flap.

It will readily be seen that an animal or other living thing descending through the funnel shaped passageway 4 to get the bait will by its weight tilt the flap 5 downwards, and be precipitated into the trap, and the flap will be automatically thrown back to its normally closed position by the weight 9. In order to provide a smooth surface for the inner wall of the funnel shaped passageway 4, by means of which the animal or other living thing descending through said passageway may readily slip through the same, and not catch the wire mesh of the receptacle with its feet, when the trap door 5 gives way, a funnel 12, of tin or other suitable material with a tapering flange 13, is provided which fits into and extends down to the bottom of the funnel shaped passageway 4, and has its flange 13, overlapping and fitting over the top of the trap about the upper end of the passageway 4. A rat descending through the funnel 12 is prevented thereby from catching the wires of the receptacle. If desired the funnel 12 may be fastened to the trap in any suitable manner, but is preferably detachable.

By means of this trap, English sparrows, and other small birds, besides rats, and mice, and other animals may be readily and quickly caught, the door 5 being instantly automatically closed when the animal or bird drops into the trap.

As the traps are most frequently placed in cellars, damp closets, or other exposed locations, the tin funnels soon become rough through accumulations of rust, and would afford footholds for the rats or mice. By making the sheet metal funnel detachable it may be removed from the trap without impairing the efficiency of the latter, inasmuch as the wire fabric funnel will act to prevent displacement of the trap door, and the trap may be used temporarily without the sheet metal funnel or a new sheet metal funnel may be readily placed in position.

In lieu of the funnel 12 with flange 13 a circumferential strip 14 of tin or other suitable smooth material may be used. The strip 14 extends about the mouth of the wire funnel 4, and over the wires adjacent thereto a sufficient distance to prevent an animal passing through the funnel from grasping the wires of the trap with its hind feet. The strip 14 may be secured in place by any suitable means, as for example, by a flange 15 bent over the edge of the mouth of funnel 4. If desired the wire funnel 4 may be dispensed with and the wire trap 1 formed with an entrance opening 16 in its top in which is suspended the funnel 12 with its flange 13 extending over the top of the trap similarly to the position in Fig. 1.

What is claimed is:—

In an animal trap, a receptacle formed of wire fabric and provided at its top with an entrance funnel of wire fabric, a pivot rod carried by the body at one side of the lower end of the funnel, a counter-weighted trap door mounted on the pivot rod and arranged to close against the bottom of the entrance funnel, and a funnel shaped sheet metal mouth arranged within the funnel and provided at its top with an outward extending flange that is curved to conform to the shape of the receptacle surrounding the fabric funnel, the mouth being freely insertible and removable into and from the fabric funnel.

In testimony that I claim the foregoing as my own, I have hereto affixed my signature in the presence of two witnesses.

NATHAN J. BARRON.

Witnesses:
F. L. LUCKET,
I. E. LANIER.